UNITED STATES PATENT OFFICE.

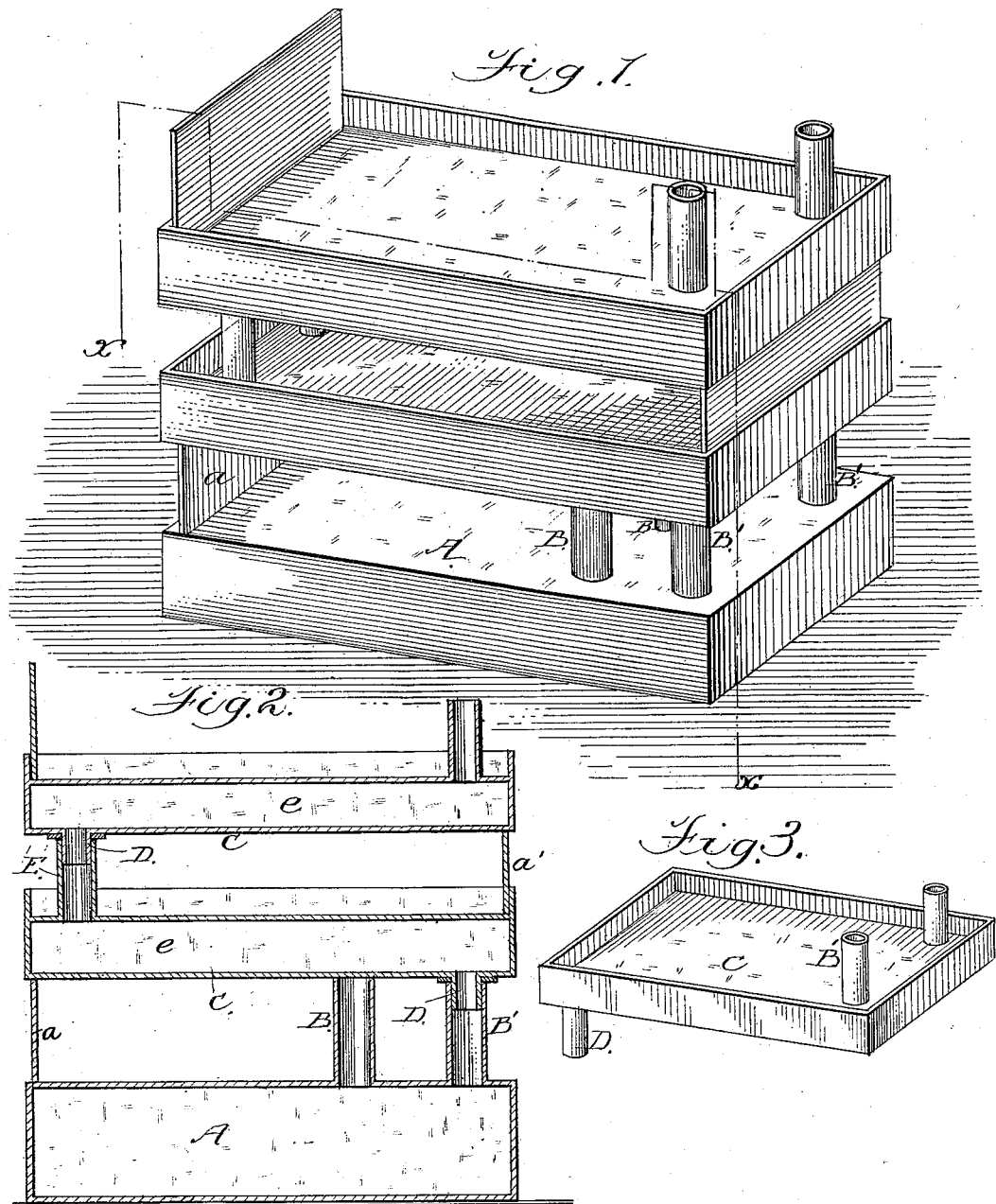

ALBERT W. WALKER, OF CLEMMONSVILLE, NORTH CAROLINA, ASSIGNOR OF ONE-HALF TO BURGESS L. FARABEE AND THOS. W. GRIFFITH, BOTH OF SAME PLACE.

FRUIT-DRIER.

SPECIFICATION forming part of Letters Patent No. 250,309, dated November 29, 1881.

Application filed August 10, 1881. (No model.)

*To all whom it may concern:*

Be it known that I, A. W. WALKER, of Clemmonsville, North Carolina, have invented a new and useful Improvement in Fruit-Driers, of which the following is a clear, full, and exact description, reference being had to the accompanying drawings, making a part of this specification, in which—

Figure 1 is a perspective view of a fruit-drier with my improvements attached. Fig. 2 is a vertical section through *x x*. Fig. 3 is a pan detached from the boiler.

The object of my invention is to rapidly dry fruits of all kinds capable of being dried; and it consists in the combination of devices hereinafter described and claimed.

To enable others skilled in the art to make and use my invention, I will proceed to describe the exact manner in which I have carried it out.

In the drawings, A represents a boiler in the usual form of boilers for this class of driers. On one end of this boiler is secured the shelf-support *a*, and at the opposite end two short pipes, B', of same height as the support *a*, communicating with the interior of the boiler. Two other pipes, B, of similar size, are inserted in the top of the boiler, for a purpose hereinafter explained.

The pans or trays C for holding the fruit to be dried are constructed with a double bottom, leaving a steam-space, *e*, between the two bottoms, and with a flange or rim for securing the fruit on the trays. Below the bottom of the tray descend two pipes, D, which fit into and telescope with the pipes B', allowing the tray to rest at one end on the pipes B', while the opposite end rests upon the support *a*. From the inside of the tray C, at one end, rise two short pipes, E, similar to the pipes B' on the boiler. The pipes E communicate with the interior of the steam-space *e*. At the opposite end of the tray rises a tray-support, *a*, similar to the support *a* on the boiler. Any number of these trays may be used when thus constructed, the pipes D fitting into and telescoping with the pipes E in the tray beneath, and the tray resting upon the support at the opposite end. The pipes B, of which there may be any desired number, allow the steam from the boiler to impinge directly upon the bottom of the first or lowest tray, and thus aid in heating it to a degree required for rapidly drying the fruit. When desired, these pipes can be closed by any of the well-known means.

The operation of my device is as follows: The boiler, being filled with water, is subjected to heat, and as the water becomes heated it passes from the boiler up through the pipes B', D, and E to the steam-chambers in each tray, to dry the fruit in that tray.

I am aware that it is not new to place a succession of steam-chambers above and connected with a boiler, nor is it new to have these chambers removable. I therefore do not claim such, broadly.

Having thus explained my invention, what I claim to be new, and desire to secure by Letters Patent, is—

A fruit-drier constructed as described, and consisting, essentially, of the boiler A, provided with the pipes B B', the pipes B of which impinge against the bottom of the lowest tray, as described, and the support *a*, in combination with one or more removable pans or trays, C, provided with pipes D E and supports *a a'*, substantially as and for the purpose set forth.

ALBERT WASHINGTON WALKER.

Witnesses:
JOHN A. FARABEE,
OLIN W. JONES.